(12) United States Patent
Takaoka et al.

(10) Patent No.: US 8,749,125 B2
(45) Date of Patent: Jun. 10, 2014

(54) SPARK PLUG

(75) Inventors: Katsuya Takaoka, Komaki (JP);
Hironori Uegaki, Nagoya (JP);
Hirokazu Kurono, Nagoya (JP);
Toshitaka Honda, Tokyo (JP)

(73) Assignee: NGK Spark Plug Co., Ltd., Aichi (JP)

( * ) Notice: Subject to any disclaimer, the term of this patent is extended or adjusted under 35 U.S.C. 154(b) by 32 days.

(21) Appl. No.: 13/377,934

(22) PCT Filed: Jul. 2, 2010

(86) PCT No.: PCT/JP2010/004367
§ 371 (c)(1),
(2), (4) Date: Dec. 13, 2011

(87) PCT Pub. No.: WO2011/001699
PCT Pub. Date: Jan. 6, 2011

(65) Prior Publication Data
US 2012/0080996 A1 Apr. 5, 2012

(30) Foreign Application Priority Data
Jul. 3, 2009 (JP) ................................. 2009-159329

(51) Int. Cl.
*F02M 57/06* (2006.01)
*F02P 13/00* (2006.01)
*H01T 13/00* (2006.01)

(52) U.S. Cl.
USPC ........... 313/118; 313/137; 313/141; 313/143; 445/7

(58) Field of Classification Search
USPC ..................... 313/118, 141, 137, 143; 445/7
See application file for complete search history.

(56) References Cited

U.S. PATENT DOCUMENTS

| 5,384,293 A | 1/1995 | Omori et al. |
| 2001/0004184 A1* | 6/2001 | Ito et al. ........................ 313/143 |

(Continued)

FOREIGN PATENT DOCUMENTS

| EP | 1 669 333 A1 | 6/2006 |
| JP | 07-12969 B2 | 2/1995 |

(Continued)

OTHER PUBLICATIONS

English language translation of JP 2002-2461465, Aug. 30, 2002.*

(Continued)

*Primary Examiner* — Thomas A Hollweg
(74) *Attorney, Agent, or Firm* — Sughrue Mion, PLLC

(57) ABSTRACT

A task of this invention is to provide a spark plug that is superior in withstand voltage characteristics at high temperatures. A spark plug of this invention is equipped with a center electrode, an insulator, and a metal shell, and is characterized by that the insulator is equipped with an alumina-based sintered body containing silicon component (Si component), magnesium component (Mg component), at least one component of calcium component, strontium component, and barium component, and a rare earth element component (RE component), that a grain boundary phase of the alumina-based sintered body has a hexaaluminate crystal containing the RE component, that, in the alumina-based sintered body, the weight ratio of the RE component to the Mg component is $5.4 \leq RE$ oxide/$MgO \leq 17.5$, and that the content of an alkali metal component in terms of oxide in a spot having a diameter of 0.3 nm, where the hexaaluminate crystal or the hexaaluminate crystal and Si component in the grain boundary phase is present by TEM, ranges from 0.01 weight % to 20 weight %.

6 Claims, 2 Drawing Sheets

(56) References Cited

U.S. PATENT DOCUMENTS

| | | |
|---|---|---|
| 2002/0024160 A1* | 2/2002 | Sugimoto .................. 264/12 |
| 2006/0186780 A1* | 8/2006 | Ogata et al. ................ 313/118 |
| 2007/0228915 A1 | 10/2007 | Honda et al. |

FOREIGN PATENT DOCUMENTS

| | | |
|---|---|---|
| JP | 07-17436 B2 | 3/1995 |
| JP | 08-169753 A | 7/1996 |
| JP | 11-49571 A | 2/1999 |
| JP | 2951771 B2 | 9/1999 |
| JP | 2000-272958 A | 10/2000 |
| JP | 2001-002464 A | 1/2001 |
| JP | 2001-335360 A | 12/2001 |
| JP | 2002-246146 A | 8/2002 |
| JP | 2007-250379 A | 9/2007 |
| WO | WO 2005/033041 A1 | 4/2005 |

OTHER PUBLICATIONS

International Search Report of PCT/JP2010/004367, dated Sep. 21, 2010.

Extended European Search Report dated May 14, 2013 for corresponding European Patent Application No. 10 79 3870.

Office Action dated Sep. 29, 2013 from the People's Republic of China Patent Office in a counterpart Chinese Application No. 201080029677.8.

* cited by examiner (a)

(b)

SPARK PLUG

CROSS REFERENCE TO RELATED APPLICATIONS

This application is a National Stage of International Application No. PCT/JP2010/004367 filed Jul. 2, 2010, claiming priority based on Japanese Patent Application No. 2009-159329 filed Jul. 3, 2009 the contents of all of which are incorporated herein by reference in their entirety.

TECHNICAL FIELD

This invention relates to a spark plug and particularly in detail relates to a spark plug that is superior in withstand voltage characteristics at high temperatures.

BACKGROUND TECHNOLOGY

Hitherto, various technologies for improving withstand voltage of alumina-containing insulators have been developed.

For example, in Patent Publication 1, there is described a high-insulation, high-alumina porcelain composition using "a mixed raw material powder made up of either at least one additive selected from $Y_2O_3$, $ZrO_2$ and $La_2O_3$, or a solid solution composite oxide of at least one additive selected from $Y_2O_3$, $ZrO_2$ and $La_2O_3$, and alumina, and an alumina fine particle powder having a particle size of 0.5 μm or less" (see claim 1 of Patent Publication 1).

Furthermore, "an alumina porcelain" of Patent Publication 2 is described as "comprising an alumina ($Al_2O_3$) having an average particle size of 1 μm or less, and at least one of a compound of and a mixture of at least one of yttria ($Y_2O_3$), magnesia (MgO), zirconia ($ZrO_2$) and lanthanum oxide ($La_2O_3$), and $Al_2O_3$, which is formed in the grain boundary phase, and as having a porosity of 6 volume % or less" (see claim 1 of Patent Publication 2).

"A high withstand-voltage, alumina-based sintered body" of Patent Publication 3 is described "in case that the respective contents in terms of oxide of Si component, Ca component and Mg component contained in 100 parts by weight of the alumina-based sintered body are respectively represented by S (unit: parts by weight), C (unit: parts by weight) and M (unit: parts by weight), as that the respective contents of the above three components satisfy the following relation, $$0.95 \geq S/(S+C+M) \geq 0.75$$

and as having at least a mullite ($Al_6Si_2O_{13}$) crystalline phase as the crystalline phase" (see claim 1 of Patent Publication 3).

In Patent Publication 4, there is described "a rare earth oxide-alumina-silica sintered body which is characterized by that it is a sintered body of 5-95 wt % rare earth oxide, 94.9-4.9 wt % alumina and 0.1-10 wt % silica and that crystal grain size of this sintered body is 30 μm or less" (see claim 1 of Patent Publication 4).

In Patent Publication 5, there is described "a spark plug insulator which is characterized by that, when the sum of the constituent components is defined as 100 mass %, Al component is 95-99.8 mass %, that a rare earth element and a Si component are contained such that the ratio ($R_{RE}/R_{si}$) of the rare earth element ($R_{RE}$) to the Si component ($R_{si}$) becomes 0.1-1.0, and that the number of alumina particles existing per 1 $mm^2$ of the section to have the maximum length of 10 μm or greater and an aspect ratio of 3 or greater is less than 10" (see claim 1 of Patent Publication 5).

In Patent Publication 6, there is described "an alumina porcelain composition which is characterized by that it is an alumina porcelain composition containing alumina as a main component, that it comprises a composite sintered body of the alumina as the main component and a composition of at least one element selected from Al, Si, Mg and rare earth elements, and that, when the alumina as the main component is 100 parts by weight, the composition of the at least one element selected from the Al, Si, Mg and rare earth elements is 5 parts by weight or less" (see claim 1 of Patent Publication 6).

A spark plug for internal-combustion engines, which is described in Patent Publication 7, is described as that it suffices that a component to be contained in addition to alumina component is made up of one or at least two selected from Si component, Ca component, Mg component, Ba component and B component, that it suffices to conduct the mixing such that the content of the added element series powder is in a range of 4-7 mass % as the sum of the content of each component in weight in terms of oxide, that it is possible to conduct the mixing such that, as each added element series powder, for example, Si component is in the form of $SiO_2$ powder, Ca component is $CaCO_3$ powder, Mg component is MgO powder, Ba component is $BaCO_3$ powder, and B component is $H_3BO_3$ powder (or may be aqueous solution), and that, as each component of Si, Ca, Mg and Ba in the added element series powder, it is also possible to use various inorganic raw material powders such as hydroxides, carbonates, chlorides, sulfates, nitrates and phosphates, in addition to oxides.

$B_y$, the way, there has been a demand for a spark plug equipped with an insulator that is further superior in withstand voltage characteristics and particularly further superior in withstand voltage characteristics at high temperatures susceptible to insulation breakdown, as compared with the above-mentioned conventional spark plugs.

PRIOR ART PUBLICATIONS

Patent Publications

Patent Publication 1: Japanese Patent Application Examined Publication No. 7-17436
Patent Publication 2: Japanese Patent Application Examined Publication No. 7-12969
Patent Publication 3: Japanese Patent Application Publication No. 2001-2464
Patent Publication 4: Japanese Patent No. 2951771
Patent Publication 5: Japanese Patent Application Publication No. 2001-335360
Patent Publication 6: PCT International Patent Publication No. 2005/033041
Patent Publication 7: Japanese Patent Application Publication No. 2007-250379

SUMMARY OF THE INVENTION

Task to be Solved by the Invention

A task to be solved by this invention is to provide a spark plug that is superior in withstand voltage characteristics at high temperatures.

Another task to be solved by this invention is to provide a spark plug that shows high withstand voltage characteristics at high temperatures, while maintaining thermal shock properties and/or sinterability.

Means for Solving the Task

Means for solving the task are as follows.

(1) A spark plug equipped with a center electrode, a substantially cylindrical insulator provided on a periphery of the center electrode, and a substantially cylindrical metal shell provided on a periphery of the insulator, the spark plug being characterized by that the insulator is equipped with an alumina-based sintered body containing silicon component (hereinafter referred to as Si component), magnesium component (hereinafter referred to as Mg component), at least one component (hereinafter referred to as group 2 element component) selected from calcium component, strontium component, and barium component, and a rare earth element component (hereinafter referred to as RE component), that a grain boundary phase of the alumina-based sintered body has a hexaaluminate crystal containing the RE component, that, in the alumina-based sintered body, ratio of the RE component to the Mg component by mass ratio in terms of oxide (RE oxide/MgO) satisfies $5.4 \leq$ RE oxide/MgO$\leq 17.5$, and that content of an alkali metal component in terms of oxide in a spot, where the hexaaluminate crystal is present, of circular spots having a diameter of 0.3 nm ranges from 0.01 mass % to 20 mass % when the grain boundary phase of the alumina-based sintered body is observed with a transmission electron microscope.

(2) A spark plug according to (1), wherein the spot where the alkali metal component content is in the range contains the hexaaluminate crystal and the Si component.

(3) A spark plug according to (1) or (2), wherein, in the alumina-based sintered body, ratio of the RE component to the Si component, the Mg component and the group 2 element component by mass ratio in terms of oxide {RE oxide/(SiO$_2$+MgO+the group 2 element oxide)} satisfies $0.25 \leq$ RE oxide/(SiO$_2$+MgO+the group 2 element oxide)$\leq 0.82$.

(4) A spark plug according to any one of (1) to (3), wherein the barium component (hereinafter referred to as Ba component) is contained in the alumina-based sintered body, wherein the group 2 element component contained in the alumina-based sintered body is the calcium component (hereinafter referred to as Ca component) and/or the strontium component (hereinafter referred to as Sr component), and wherein in the alumina-based sintered body the ratio of the Ba component to the Ba component, the Mg component and the Ca component and/or the Sr component by mass ratio in terms of oxide {BaO/(MgO+CaO+SrO+BaO)} satisfies $0.3 \leq$ BaO/(MgO+CaO+SrO+BaO)$\leq 0.8$.

(5) A spark plug according to any one of (1) to (4), wherein the hexaaluminate crystal has an average particle size of 5 μm or less.

(6) A spark plug according to any one of (1) to (5), wherein a layered structure or a solid solution is formed by the hexaaluminate crystal and the Mg component and the group 2 element component.

(7) A spark plug according to any one of (1) to (6), wherein the alumina-based sintered body is produced by mixing an alumina raw material with a secondary raw material comprising the Si component, the Mg component and the group 2 element component, and the RE component in a slurry, followed by granulation, shaping and burning, and wherein the particle size ratio ($D_{alumina\ raw\ material}/D_{secondary\ raw\ material}$) of the average particle size of the alumina raw material to the average particle size of the secondary raw material in the slurry is $1.2 \leq D_{alumina\ raw\ material}/D_{secondary\ raw\ material} \leq 4.4$.

Advantageous Effect of the Invention

According to this invention, it is possible to provide a spark plug that is superior in withstand voltage at high temperatures, due to that the components of the alumina-based sintered body satisfy a particular content ratio and that an alkali metal component is contained by a particular amount in a spot, where the hexaaluminate crystals are present, of circular spots having a diameter of 0.3 nm arbitrarily selected on a transmission electron microscope image of the grain boundary phase of the alumina-based sintered body.

Furthermore, according to this invention, it is possible to provide a spark plug having high thermal shock properties, since cracks causing fracture of the sintered body are hardly generated due to that the hexaaluminate crystals have a particle size of 5 μm or less.

Furthermore, according to this invention, it is possible to provide a spark plug that is capable of achieving sinterability and easiness for generating hexaaluminate crystals due to that the particle size ratio of the respective raw materials in the slurry satisfy a particular numerical range.

BRIEF DESCRIPTION OF THE DRAWINGS

FIG. 1 shows one embodiment of a spark plug according to this invention, in which FIG. 1(a) is a partially sectional, explanatory view showing a spark plug that is one embodiment, and FIG. 1(b) is a sectional explanatory view showing a front end portion of the spark plug.

FIG. 2 shows one exemplary apparatus for measuring withstand voltage characteristics at high temperatures of an insulator in a spark plug according to this invention, in which FIG. 2(a) is an overhead view of a sintered body and a metal ring, and FIG. 2(b) is a sectional view of the sintered body and the ring.

MODE FOR CARRYING OUT THE INVENTION

Figure 1:
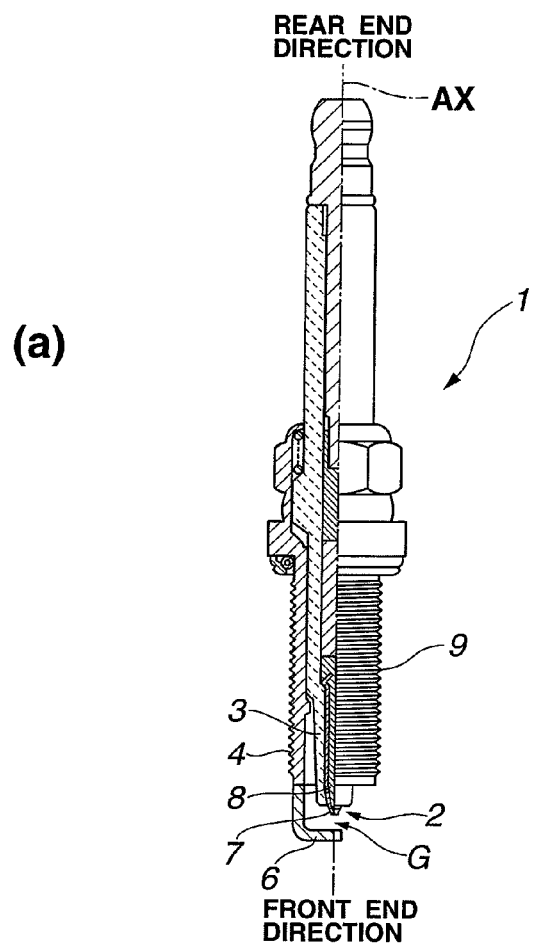
Figure 1:
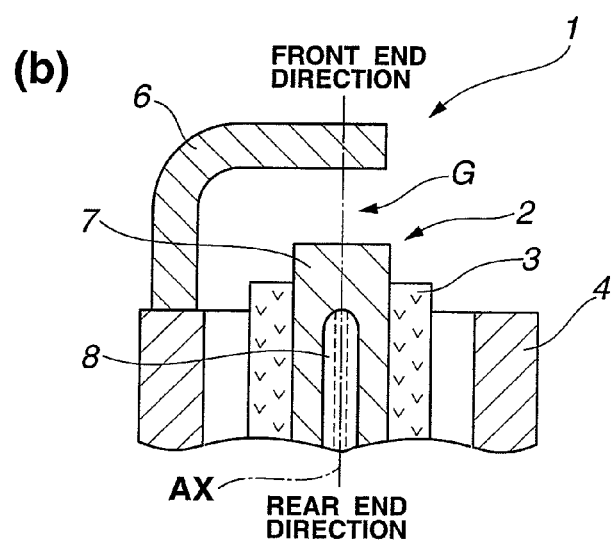

The spark plug according to this invention is a spark plug equipped with a center electrode, a substantially cylindrical insulator provided on a periphery of the center electrode, and a substantially cylindrical metal shell provided on a periphery of the insulator. The insulator is equipped with an alumina-based sintered body containing silicon component (hereinafter referred to as Si component), magnesium component (hereinafter referred to as Mg component), at least one component (hereinafter referred to as group 2 element component) selected from calcium component, strontium component, and barium component, and a rare earth element component (hereinafter referred to as RE component). A grain boundary phase of the alumina-based sintered body has hexaaluminate crystal containing the RE component. In the alumina-based sintered body, the ratio of the RE component to the Mg component by mass ratio in terms of oxide (RE oxide/MgO) satisfies $5.4 \leq$ RE oxide/MgO$\leq 17.5$. Content of an alkali metal component in terms of oxide in a spot, where the hexaaluminate crystal is present, more preferably in a spot, where the hexaaluminate crystal and the Si component are present, of circular spots having a diameter of 0.3nm is from 0.01 mass % to 8 mass % or over 8 mass % to 20 mass % when the grain boundary phase of the alumina-based sintered body is observed with a transmission electron microscope.

Most of the components, except the Si component, the Mg component, the group 2 element component, and the RE component, which are contained in the alumina-based sintered body, is aluminum component (hereinafter referred to as Al component), and it contains alkali metal as an inevitable impurity. Furthermore, most of the Al component is in the form of aluminum oxide ($Al_2O_3$), that is, alumina, and it is contained in the alumina-based sintered body.

In the alumina-based sintered body, the content of the Al component preferably ranges from 85 mass% to 95 mass % in terms of oxide when the amount of the alumina-based sintered body after sintering is 100 mass %. If the content of the At component is 85 mass % to 95 mass % in terms of oxide, it is possible to maintain withstand voltage characteristics of the insulator in the spark plug of this invention at high levels.

The Si component is a component derived from the sintering aid and exists as oxide, ion, etc. in the alumina-based sintered body. Since the Si component melts upon sintering and thereby generates normally a liquid phase, it works as a sintering aid for accelerating densification of the sintered body. Furthermore, it is common that after sintering the Si component forms a low-melting-point glass or the like in the grain boundary phase of the alumina crystal particles. If the alumina-based sintered body, however, contains the after-mentioned Mg component, the group 2 element component and the RE component in addition to the Si component, the Si component tends to preferentially form a high-melting-point glass or the like with other components rather than a low-melting-point glass.

As raw materials of the Si component, it is possible to mention silicon oxides and compounds that are converted to Si component by burning. As the compounds that are converted to the Si component, it is possible to mention various inorganic powders, for example, of silicon's oxides, complex oxides, hydroxides, carbonates, chlorides, sulfates, nitrates, phosphates, etc. Specifically, it is possible to mention $SiO_2$ powder, etc. Furthermore, in the case of using a powder other than the above oxide as a compound powder capable of becoming Si component, its usage is grasped by mass % in terms of oxide when it is converted to oxide. Purity and the average particle size of the raw material powder of Si component are basically similar to those of the compound powder capable of becoming Al component.

The Mg component and the group 2 element component, which are contained in the alumina-based sintered body, are components derived from the sintering aid. That is, the Mg component is an essential component in the spark plug of this invention. Furthermore, it suffices that the group 2 element component is a compound containing at least one selected from the group consisting of calcium component (hereinafter may be referred to as Ca component), strontium component (hereinafter may be referred to as Sr component), and barium component (hereinafter may be referred to as Ba component). The Mg component and the group 2 element component exist as oxide, ion, etc. in the alumina-based sintered body and work as a sintering aid upon sintering similar to the Si component. The group 2 element component is preferably in a combination of Ba component and Ca component. By containing the group 2 element component, the obtained alumina-based sintered body can be improved in high temperature strength.

The raw materials of the Mg component and the group 2 element component are not particularly limited, as long as they are compounds capable of becoming Mg component and the group 2 element component, that is, compounds that are converted to Mg component and the group 2 element component, by burning. It is possible to mention various inorganic powders, for example, of oxides, complex oxides, hydroxides, carbonates, chlorides, sulfates, nitrates, etc., and phosphates, etc. of Mg and group 2 elements. Specifically, it is possible to mention MgO powder and $MgCO_3$ powder as Mg compound powder. It is possible to mention CaO powder and $CaCO_3$ powder as Ca compound powder. It is possible to mention BaO powder and $BaCO_3$ powder as Ba compound powder.

Furthermore, in the case of using powders other than the above oxides as compound powders capable of becoming Mg component and the group 2 element component, its usage is grasped by mass % in terms of oxide when it is converted to oxide. Purity and the average particle size of the raw material powders of the Mg component and the group 2 element component are basically similar to those of the compound powder capable of becoming Al component. Purity and the average particle size of the compound powders of the Mg component and the group 2 element component are basically similar to those of the compound powder capable of becoming Al component.

The RE component is a component derived from the sintering aid and exists as oxide, ion, etc. in the alumina-based sintered body. As RE component, it is possible to mention scandium component (hereinafter may be referred to as Sc component), yttrium component (hereinafter may be referred to as Y component), for example, oxides of yttrium, and lanthanoid component. As specific examples of RE component contained in the alumina-based sintered body, it is possible to mention Sc component, Y component, lanthanum component (hereinafter may be referred to as La component), for example, lanthanum oxide, cerium component (hereinafter may be referred to as Ce component), praseodymium component (hereinafter may be referred to as Pr component), neodymium component (hereinafter may be referred to as Nd component), for example, oxides of neodymium, promethium component (hereinafter may be referred to as Pm component), for example, oxides of promethium, samarium component (hereinafter may be referred to as Sm component), europium component (hereinafter may be referred to as Eu component), gadolinium component (hereinafter may be referred to as Gd component), terbium component (hereinafter may be referred to as Tb component), dysprosium component (hereinafter may be referred to as Dy component), holmium component (hereinafter may be referred to as Ho component), erbium component (hereinafter may be referred to as Er component), thulium component (hereinafter may be referred to as Tm component), ytterbium component (hereinafter may be referred to as Yb component), for example, oxides of ytterbium, lutetium component (hereinafter may be referred to as Lu component), etc. As preferable ones of the RE component, it is possible to mention La component, Nd component, Pr component, Y component, Yb component, etc.

Due to being contained in the alumina-based sintered body upon sintering, RE component suppresses an excessive particle growth of alumina upon sintering and forms glass in the grain boundary phase together with the Si component. Since a glass containing the RE component is high in melting point, it is capable of improving not only withstand voltage characteristics of the alumina-based sintered body at high temperatures, but also high-temperature strength of the alumina-based sintered body.

Furthermore, it is considered that La component, Nd component, Pr component, Y component and Yb component have small ion radii, are capable of forming a high-melting-point crystal phase together with the Si component, and furthermore easily form hexaaluminate crystals having a high melting point of about 2000° C. together with Al component.

Furthermore, the hexaaluminate crystals have β-alumina structure, and have a crystal phase represented, for example, by $MgAl_{12}O_{19}$, $CaAl_{12}O_{19}$, $REAl_{11}O_{18}$, etc. Therefore, when the alumina-based sintered body contains as RE component at least one component selected from the group consisting of La component, Nd component, Pr component, Y component and Yb component, high-melting-point hexaaluminate crystals are easily formed. Therefore, when the alumina-based sintered body is formed into an insulator of spark plug, it is possible to improve withstand voltage characteristics and high-temperature strength. It suffices that the hexaaluminate crystals exist in the alumina-based sintered body. Preferably, it suffices that the hexaaluminate crystals together with Si component exist in the alumina-based sintered body. Although their existence spots are not particularly limited, it is preferable that they exist into the interior of the alumina-based sintered body, and it is particularly preferable that they exist at the two grain boundary and/or triple point of the alumina crystal grains.

The existence of the hexaaluminate crystals can be identified by X-ray diffraction, for example, by using JCPDS cards. Since no JCPDS cards exist with respect to Pr component and Nd component, identification by X-ray diffraction is impossible directly. Ionic radii of $Pr^{3+}$ and $Nd^{3+}$ are, however, almost equivalent to ionic radius of $La^{3+}$. Therefore, hexaaluminate crystals containing Pr component and Nd component show an X-ray diffraction spectrum analogous to JCPDS card (No. 33-699) of hexaaluminate crystals containing La component. Therefore, it is possible to verify the existence of hexaaluminate crystals containing Pr component and Nd component by a comparison with JCPDS card of hexaaluminate crystals containing La component. If the hexaaluminate crystals are formed by deposition in the burning process, anisotropic growth of the grains upon burning hardly occurs. Therefore, it is preferable.

In particular, existence of Si component in the vicinity of the hexaaluminate crystals can further suppress anisotropic growth of the grains upon burning.

The raw materials of the RE component are not particularly limited, as long as they are oxides of RE or compounds capable of becoming RE component by burning, that is, compounds that are converted to RE component by burning. It is possible to mention various inorganic powders, for example, of RE element's oxides, complex oxides, hydroxides, carbonates, chlorides, sulfates, nitrates, phosphates, etc.

Furthermore, in a spark plug according to this invention, the content of RE component contained in the alumina-based sintered body is grasped by mass % in terms of oxide when RE component is converted to oxide. Furthermore, as content of RE component, for Ce component, mass % in terms of oxide when converted to $CeO_2$ is used, for Pr component, mass % in terms of oxide when converted to $Pr6O_{11}$ is used, and for rare-earth element components other than Ce component and Pr component, mass % in terms of oxide when converted to $RE_2O_3$. When the alumina-based sintered body contains a plurality of RE components, content of RE components is the total of content of each RE component.

In the case of using a powder other than the above-mentioned oxides as a compound powder capable of becoming RE component, the usage is grasped by mass % in terms of oxide when a compound other than the oxides has been converted to oxide. Purity and the average particle size of the raw material powder of the RE component are basically similar to those of the compound powder capable of becoming Al component. Furthermore, purity and the average particle size of the compound powder of RE component are also basically similar to those of the compound capable of becoming Al component.

In the alumina-based sintered body of the spark plug of this invention, the ratio of the RE component to the Mg component by mass ratio in terms of oxide (RE oxide/MgO) satisfies $5.4 \leq RE\ oxide/MgO \leq 17.5$. As mentioned above, Mg component is essential in the alumina-based sintered body. Therefore, "RE oxide/MgO" is the value obtained by dividing the RE component content drawn by oxide conversion by the content of magnesium oxide (MgO). If (RE oxide/MgO) is in the outside of from 5.4% to 17.5%, the formation of hexaaluminate crystals containing RE component becomes difficult.

The alumina-based sintered body contains the Al component, the Si component, the Mg component, the group 2 element component and the RE component. Furthermore, an inevitable impurity is also contained therein. As this inevitable impurity, it is possible to mention, for example, alkali metal component, that is, the group 1 element component, etc. of the periodic table based on IUPAC Recommendations 1990. As the alkali metal, it is possible to mention lithium (Li), sodium (Na), potassium (K), rubidium (Rb), cesium (Cs), and francium (Fr).

As a result of an elemental analysis of a grain boundary phase observed in a circular spot having a diameter of 0.3 nm, which is arbitrarily selected, when a grain boundary phase of the alumina-based sintered body has been observed by a transmission electron microscope, in a spot satisfying that the mass ratio (RE oxide/$Al_2O_3$) in terms of oxides of the RE component and the Al component is 0.2-2.5, it is deemed that in the spot the hexaaluminate crystals exist, and preferably the hexaaluminate crystals exist together with the Si component. In this invention, a spot in which hexaaluminate crystals are deemed to exist and preferably the hexaaluminate crystals and the Si component are deemed to exist is referred to as "existence confirmed spot". In "existence confirmed spot", the alkali metal component as an inevitable impurity is contained. In a condition that the alkali metal component, which moves easily in the grain boundary phase, is contained in "existence confirmed spot", it is deemed that the alkali metal component does not move easily even at high temperatures. When the alkali metal component does not move easily even at high temperatures, insulation breakdown generated by the movement of the alkali metal component in the grain boundary phase does not occur easily. Therefore, withstand voltage characteristics at high temperatures of the insulator in the spark plug of this invention become high.

It is advantageous that, when the total of "existence confirmed spot" is 100 mass %, the content of the alkali metal component contained in "existence confirmed spot" ranges either from 0.01 mass % to 8 mass %, or over 8 mass % to 20 mass %, that is, from 0.01 mass % to 20 mass %, preferably ranges either from 1 mass % to 8 mass %, or over 8 mass % to 20 mass %, that is, ranges from 1 mass % to 20 mass %. When the content of the alkali metal component in "existence confirmed spot" is beyond the range of 0.01 mass % to 20 mass %, the movement of the alkali metal component may occur at high temperatures. Therefore, high withstand voltage characteristics at high temperatures may not be achieved.

As a method for measuring the alkali metal content, it is possible to mention, for example, a measurement method by conducting an elemental analysis using an energy dispersive X-ray analyzer (EDX, type: Genesis 4000, detector: SUTW3.3RTEM) made by EDAX Inc., which is attached to a transmission electron microscope (TEM, type: HD-2000) made by Hitachi Ltd. As analysis conditions, it is possible to mention conditions that accelerating voltage is 200 kV, irradiation mode is HR, spot size is 0.3 nm, and with respect to "existence confirmed spot" arbitrary 30 points are observed. The average of mass % of the alkali metal component in terms of oxide in each point of the 30 points observed can be judged as the content of the alkali metal.

As a mode for further improving withstand voltage characteristics at high temperatures of the spark plug of this invention, it is possible to mention a spark plug equipped with an alumina-based sintered body in which the ratio of the RE component to the Si component, the Mg component and the group 2 element component by mass ratio {RE oxide/(SiO$_2$+MgO+the group 2 element oxide)} in terms of oxide satisfies 0.25≤RE oxide/(SiO$_2$+MgO+the group 2 element oxide) ≤0.82. If {RE oxide/(SiO$_2$+MgO+the group 2 element oxide)} satisfies 0.25-0.82, the amount of RE component contained in the hexaaluminate crystals tends to become appropriate, and furthermore sinterability is not lowered. Therefore, it is preferable.

As another mode for further improving withstand voltage characteristics at high temperatures of the spark plug of this invention, it is possible to mention a spark plug equipped with an alumina-based sintered body in which the alumina-based sintered body contains Ba component, in which the group 2 element component contained in the alumina-based sintered body is Ca component and/or Sr component, and in which in the alumina-based sintered body the ratio of the Ba component to the Ba component, the Mg component and the Ca component and/or the Sr component by mass ratio {BaO/(MgO+CaO+SrO+BaO)} in terms of oxide satisfies 0.3≤BaO/(MgO+CaO+SrO+BaO)}≤0.8. That is, when calculating the mass ratio, in case that Ca component is contained as the group 2 element component in the alumina-based sintered body, but Sr component is not, it suffices to calculate the mass ratio {BaO/(MgO+CaO+BaO)}. In case that Sr component is contained as the group 2 element component in the alumina-based sintered body, but Ca component is not, it suffices to calculate the mass ratio {BaO/(MgO+SrO+BaO)}. In case that Ca component and Sr component are contained as the group 2 element component in the alumina-based sintered body, it suffices to calculate the mass ratio {BaO/(MgO+CaO+SrO+BaO)}. Upon applying a high voltage, migration occurs more easily in the order of Mg, Ca and Ba in the group 2 elements. Therefore, if {BaO/(MgO+CaO+SrO+BaO)} satisfies 0.3-0.8, it is possible to improve withstand voltage characteristics at high temperatures. Therefore, it is preferable.

Regarding the content of each component contained in the above-mentioned alumina-based sintered body, it is possible to calculate mass % in terms of oxide by quantitative analysis or chemical analysis of the alumina-based sintered body by an electron probe micro analyzer (EPMA). Furthermore, in the spark plug of this invention, the results calculated by quantitative analysis or chemical analysis of the alumina-based sintered body by EPMA almost agree with the mixing ratio of the raw material powder.

As a mode capable of improving withstand voltage characteristics and thermal shock properties of the spark plug in this invention, it is possible to mention a mode in which the average particle size of the hexaaluminate crystals in the alumina-based sintered body is 5 μm or less. If the average particle size of the hexaaluminate crystals is 5 μm or less, it is possible to suppress a stress generated by the difference of thermal expansion coefficient between the alumina crystals and the hexaaluminate crystals. Therefore, it is possible to make withstand voltage characteristics and thermal shock properties consistent with each other.

As a method for measuring the average particle size of the hexaaluminate crystals in the alumina-based sintered body, it is possible to mention a method in which, for example, the surface of each sintered body is subjected to mirror polishing, and the polished surface is subjected to a thermal etching treatment for 10 minutes at a temperature that is lower than the sintering temperature by 100° C., and then the surface subjected to this treatment is observed with a scanning electron microscope (SEM), and the average crystal particle size of the hexaaluminate crystals is measured by the intercept method.

Furthermore, if the hexaaluminate crystals, together with the Mg component and the group 2 element component, form a layered structure or solid solution, the Mg component and the group 2 element component, which are possible to move in the grain boundary phase, are made to be difficult to move. Therefore, withstand voltage characteristics are further improved.

As a method for observing the layered structure or solid solution formed by the hexaaluminate crystals and the Mg component and the group 2 element component, it is possible to mention a method in which the alumina-based sintered body is observed, for example, with a transmission electron microscope (TEM).

In the following, the spark plug of this invention is explained.

The spark plug of this invention is equipped with a center electrode, a substantially cylindrical insulator provided on a periphery of the center electrode, and a grounding electrode having one end disposed to face the center electrode by interposing a spark discharge gap therebetween. The spark plug of this invention is not particularly limited in terms of other parts and structures, as long as it is a spark plug having such structure. Thus, it is possible to use publicly-known, various parts and structures.

A spark plug according to one embodiment of the spark plug of this invention is shown in FIG. 1. FIG. 1(a) is a partially sectional, overall explanatory view of spark plug 1 according to one embodiment of the spark plug of this invention. FIG. 1(b) is a sectional explanatory view showing a main part of spark plug 1 according to one embodiment of the spark plug of this invention.

Explanations are conducted by setting the downward direction of plane of paper to the front end direction of axis AX and setting the upward direction of plane of paper to the rear end direction of axis AX in FIG. 1(a), and setting the upward direction of plane of paper to the front end direction of axis AX and setting the downward direction of plane of paper to the rear end direction of axis AX in FIG. 1(b).

As shown in FIGS. 1(a) and (b), this spark plug 1 is equipped with a substantially rod-like center electrode 2, a substantially cylindrical insulator 3 provided on a periphery of center electrode 2, a cylindrical metal shell 4 to hold insulator 3, and a grounding electrode 6 having one end disposed to face the front end surface of center electrode 2 by interposing a spark discharge gap G therebetween and the other end joined to an end surface of the metal shell 4.

The metal shell 4 has a cylindrical shape and is formed to hold insulator 3 by putting insulator 3 thereinto. The metal shell 4 is formed on its peripheral surface in the front end direction with a threaded portion 9. Using this threaded portion 9, spark plug 1 is fitted on a cylinder head (not shown in the drawings) of an internal combustion engine. In case that spark plug 1 is fitted on a high-powered internal combustion engine and/or small-sized internal combustion engine in recent years, normally, nominal diameter of the threaded portion 9 is adjusted to 10 mm or less. The metal shell 4 can be formed by a conductive steel material, for example, low-carbon steel.

The center electrode 2 is formed of an outer member 7 and an inner member 8 formed to be concentrically embedded into an axis portion of the inside of the outer member 7. The center electrode 2 is, under a condition that its front end portion protrudes from the front end surface of the after-mentioned insulator 3, fixed to the axial hole of the insulator 3 and held to be insulated against the metal shell 4. The outer member 7 of the center electrode 2 can be formed of a nickel-based alloy superior in heat resistance and corrosion resistance, and the inner member 8 of the electrode 2 can be formed of a metal material superior in thermal conductivity, such as copper (Cu) or nickel (Ni), etc.

The grounding electrode 6 is designed in its shape and structure such that, for example, it is formed into a prismatic body, that it's one end is joined to an end surface of the metal shell 4, that on the way it is bent into generally L shape, and that its front end portion is positioned in the direction of axis AX of the center electrode 2. By designing the grounding electrode 6 like this, one end of the grounding electrode 6 is disposed to face the center electrode 2 by interposing the spark discharge gap G therebetween. The spark discharge gap G is a gap between the front end surface of the center electrode 2 and the surface of the grounding electrode 6. This spark discharge gap G is set to normally 0.3-1.5 mm. Since the grounding electrode 6 is exposed to high temperatures than the center electrode 2 is, it is preferable to form that with a Ni-based alloy or the like that is further superior in heat resistance, corrosion resistance, etc. to a Ni-based alloy forming the center electrode 2.

The insulator 3 is held on an inner peripheral portion of the metal shell 4 by interposing talc and/or packing, etc. (not shown in the drawings) therebetween and has an axial hole for holding center electrode 2 along the axis AX of the insulator 3. The insulator 3 is fixed to the metal shell 4 under a condition that an end portion in the front end direction in the insulator protrudes from the front end surface of the metal shell 4.

In the spark plug 1, the insulator 3 is equipped with an alumina-based sintered body containing Si component, Mg component, at least one component selected from the group consisting of Ca component, Sr component and Ba component, and RE component. A grain boundary phase of the alumina-based sintered body has hexaaluminate crystals containing the RE component. In the alumina-based sintered body, the ratio of the RE component to the Mg component by mass ratio (RE oxide/MgO) in terms of oxide satisfies $5.4 \leq$ RE oxide/MgO $\leq 17.5$. The content of an alkali metal component in terms of oxide in a spot, where the hexaaluminate crystals and the Si component are present, of circular spots having a diameter of 0.3 nm 0.01-20 mass % when the grain boundary phase of the alumina-based sintered body is observed with a transmission electron microscope. Compounds contained in the insulator 3 and properties may be omitted, since they are mentioned above.

In a method for producing a spark plug according to this invention, at first raw material powders, that is, powders of compounds, which are converted by the burning to the Al component, the Si component, the Mg component, the group 2 element component and the RE component, are mixed together in a slurry. In some cases, respective powders (these powders can also be referred to as the raw material powders) of the same substance as the At component, the same substance as the Si component, the same substance as the Mg component, the same substance as the group 2 element component, and the same substance as the RE component are mixed together in a slurry. In this mixing, it is preferable to conduct the mixing for 8 hours or longer to make the mixed condition of the raw material powders homogeneous and to highly densify the sintered body to be obtained. Furthermore, a powder of the compound added to Al component by burning is referred to as alumina raw material, and powders of the compounds added to Si component, Mg component, the group 2 element component and RE component by burning are referred to as secondary raw materials.

In the powders to be mixed in the step for mixing this raw material powder in a slurry, when the particle size ratio ($D_{alumina\ raw\ material}/D_{secondary\ raw\ material}$) of the average particle size of the alumina raw material to the average particle size of the secondary raw material in the slurry is $1.2 \leq D_{alumina\ raw\ material}/D_{secondary\ raw\ material} \leq 4.4$, it becomes easy to form the hexaaluminate crystals, while maintaining a good sinterability. Therefore, it is preferable. The average particle size of the powders can be measured, for example, by laser diffractometry by Microtrac particle size distribution measurement device (MT-3000) made by NIKKISO CO., LTD.

As a binder, for example, a hydrophilic binder can also be mixed with the raw material powder. As this hydrophilic binder, it is possible to mention, for example, polyvinyl alcohol, water-soluble acrylic resin, Arabic gum, dextrin, etc. Furthermore, as a solvent for dispersing the raw material powder, it is possible to use, for example, water, alcohol, etc. These hydrophilic binders and solvents can be used singly or in a combination of at least two kinds. Regarding the proportions in use of the hydrophilic binder and the solvent, the hydrophilic binder is 0.1-7 parts by weight, preferably 1-5 parts by weight, provided that the raw material powder is 100 parts by weight. Furthermore, if water is used as the solvent, it can be 40-120 parts by weight, preferably 50-100 parts by weight.

As a step next to the step in which the raw material powders have been mixed together, the raw material powder is dispersed in the solvent, followed by adding the binder. With this, it is possible to obtain a slurry in which the raw material powder has been dispersed.

Next, the obtained slurry is granulated to have an average particle size of 30-200 µm, preferably 50-150 µm, through spray drying by spray dry method, etc.

Next, the granulated material is molded to obtain an unburned molded body. The unburned molded body obtained is ground to adjust the shape. This unburned molded body is formed of the granulated material having a relatively large average particle size. Therefore, it is superior in workability and can be shaped into a desired shape with ease and high productivity.

The unburned molded body ground and shaped into a desired shape is burned in air atmosphere at 1500-1700° C., more preferably 1550-1650° C., for 1-8 hours, more preferably 3-7 hours, to obtain an alumina-based sintered body. If the burning temperature is 1500-1700° C., it is easy to sufficiently densify the sintered body, and the abnormal grain growth of alumina does not occur easily. Therefore, it is possible to secure withstand voltage characteristics and mechanical strength of the alumina-based sintered body to be obtained. Furthermore, if burning time is 1-8 hours, it is easy to sufficiently densify the sintered body, and the abnormal grain growth of alumina does not occur easily. Therefore, it is possible to secure withstand voltage characteristics and mechanical strength of the alumina-based sintered body to be obtained.

By sintering the unburned molded body, it is possible to obtain an alumina-based sintered body. The obtained alumina-based sintered body is superior in withstand voltage characteristics at high temperatures and high-temperature strength, since an alkali metal component is contained in "existence confirmed spot" in arbitrarily selected spots having a diameter of 0.3 nm when the grain boundary phase is observed with TEM. Therefore, the alumina-based sintered body is particularly preferable as insulator 3 of spark plugs for high-powered internal combustion engines. If desired, the alumina-based sintered body may be shaped again in its shape, etc. In this manner, it is possible to prepare an alumina-based sintered body and an insulator for spark plug 1, which is made up of this alumina-based sintered body.

EXAMPLES (Preparation of Insulator in Spark Plug)

As raw material powders, an alumina powder having an average particle size of 2.1 μm, $SiO_2$ powder, respective carbonate powders of magnesium (Mg) component, calcium (Ca) component, strontium (Sr) component and barium (Ba) component, and a rare earth element-containing powder were mixed together. Furthermore, a binder such as polyvinyl alcohol and water as the solvent were added to prepare a base slurry for molding.

The obtained base slurry for molding was spray dried by spray dry method or the like to prepare a spherical, base granulated material for molding. Furthermore, the obtained base granulated material for molding was subjected to a rubber press shaping to prepare a press compact that becomes an antecedent of the insulator.

Next, this press compact is subjected at its outer side to a cutting operation with a resinoid grinder, etc. Next, the compact was burned in an atmosphere of the air at a burning temperature in a range of 1500° C.-1650° C. by setting the burning time at 1-8 hours, followed by glazing and finishing burning to obtain an insulator.

(Identification of Crystal Phase)

A section obtained by cutting the insulator was subjected to a grinding treatment. Then, an X-ray diffraction analysis of the section was conducted by using an X-ray diffraction apparatus made by Rigaku Corporation (type: MiniFlex, measurement angle range (2θ): 20-70°, X-ray conditions: voltage 30 kV and current 15 mA) to identify the crystal phase. Furthermore, it was also confirmed that RE component was contained in a spot identified as being hexaaluminate crystals.

(Component Amount)

The content of each component of the obtained insulator was measured by a quantitative analysis using EPMA. The content of each component contained in the insulator is shown in Table 1.

(Content of Alkali Metal Component)

The content of alkali metals contained in a spot, in which hexaaluminate crystals and Si component had been present in the insulator, was measured by conducting an elemental analysis using an energy dispersive X-ray analyzer (EDX, type: Genesis 4000, detector: SUTW3. 3RTEM) made by EDAX Inc., which is attached to a transmission electron microscope (TEM, type: HD-2000) made by Hitachi Ltd. The analysis conditions were set to conditions in which accelerating voltage was 200 kV, irradiation mode was HR, spot size was 0.3 nm, and, with respect to spots where there existed hexaaluminate crystals and Si component and glass existing in the grain boundary phase, arbitrary 30 points were observed. The average of mass % in terms of oxide of the alkali metal component measured in each point of these 30 points thus observed was judged as the content of the alkali metal. The contents of the alkali metals of each sample are shown in Table 1. In Table 1, the sample number with * refers to a comparative example.

TABLE 1

| Sample No. | $Al_2O_3$ | $SiO_2$ | MgO | BaO | CaO | SrO | $La_2O_3$ | $Nd_2O_3$ | $Pr_2O_3$ | $Y_2O_3$ | $Yb_2O_3$ | Alkali metal (wt %) |
|---|---|---|---|---|---|---|---|---|---|---|---|---|
| 1 | 92.59 | 3.69 | 0.08 | — | 2.24 | — | — | — | 1.4 | — | — | 0.01 |
| 2 | 92.66 | 2.86 | 0.08 | 3.01 | — | — | — | 1.39 | — | — | — | 0.01 |
| 3 | 92.66 | 3.92 | 0.08 | — | — | 1.95 | — | — | — | 1.39 | — | 0.01 |
| 4 | 90.85 | 5 | 0.1 | 0.5 | 1 | 0.8 | — | — | — | — | 1.75 | 0.01 |
| 5 | 91.35 | 2.65 | 0.71 | 0.54 | 0.05 | 0.73 | 3.97 | — | — | — | — | 20.00 |
| 6 | 90.85 | 2.65 | 0.81 | 0.54 | 0.05 | 0.73 | — | — | — | 4.37 | — | 8.00 |
| 7 | 93.95 | 3.35 | 0.18 | 0.45 | 0.39 | 0.51 | — | — | — | — | 1.17 | 0.90 |
| 8 | 89.48 | 5 | 0.3 | 0.2 | 0.1 | 0.12 | — | — | — | — | 4.8 | 1.40 |
| 9 | 91.40 | 4.02 | 0.20 | 0.85 | 0.73 | 1.12 | — | — | — | 1.68 | — | 2.80 |
| 10 | 90.67 | 3.92 | 0.24 | 3.05 | 0.42 | 0.05 | — | — | 1.65 | — | — | 6.20 |
| 11 | 94.83 | 2.68 | 0.15 | 0.31 | — | 1.05 | — | 0.98 | — | — | — | 1.42 |
| 12 | 93.17 | 2.02 | 0.2 | 0.44 | 0.62 | 0.44 | 3.11 | — | — | — | — | 4.68 |
| 13 | 91.51 | 4.52 | 0.1 | 0.47 | 0.8 | 0.88 | — | 1.72 | — | — | — | 8.00 |
| 14 | 93.24 | 2.52 | 0.25 | 0.32 | 0.63 | — | 3.04 | — | — | — | — | 7.92 |
| 15 | 93.19 | 3.52 | 0.2 | 0.46 | 1.04 | — | — | — | 1.59 | — | — | 7.88 |
| 16 | 93.5 | 2.02 | 0.2 | 0.48 | 0.66 | 0.36 | 2.78 | — | — | — | — | 7.91 |
| 17 | 92.30 | 3.72 | 0.21 | 0.55 | 0.42 | 0.68 | — | — | — | 2.12 | — | 7.91 |
| 18 | 91.72 | 4.43 | 0.22 | 1.92 | 0.15 | 0.10 | 1.46 | — | — | — | — | 7.91 |
| 19 | 93.48 | 2.98 | 0.20 | 0.73 | 0.42 | 0.47 | — | 1.72 | — | — | — | 7.92 |
| 20 | 93.47 | 2.45 | 0.18 | 1.42 | 0.32 | 0.28 | — | — | 1.88 | — | — | 7.92 |
| 21 | 93.61 | 3.27 | 0.24 | 0.88 | 0.44 | — | 1.56 | — | — | — | — | 7.92 |
| 22 | 93.60 | 3.12 | 0.28 | 0.84 | 0.44 | — | 1.72 | — | — | — | — | 7.94 |
| 23 | 93.61 | 3.14 | 0.24 | 0.84 | 0.44 | — | 1.73 | — | — | — | — | 7.96 |
| 24 | 93.63 | 3.16 | 0.19 | 0.85 | 0.42 | — | 1.75 | — | — | — | — | 7.98 |
| 25 | 93.29 | 2.91 | 0.22 | 0.78 | 0.39 | — | 2.41 | — | — | — | — | 7.98 |
| 26 | 93.63 | 3.19 | 0.14 | 0.85 | 0.42 | — | 1.77 | — | — | — | — | 7.99 |
| 27 | 93.04 | 2.74 | 0.21 | 0.73 | 0.37 | — | 2.91 | — | — | — | — | 7.99 |
| 1* | 93.1 | 4.2 | 0.59 | — | 1.31 | 0.8 | — | — | — | — | — | 0.00 |
| 2* | 92.49 | — | 1.58 | 0.64 | 0.55 | 0.13 | — | 4.61 | — | — | — | 0.00 |
| 3* | 95.87 | 3.2 | — | — | — | — | — | — | — | 0.93 | — | 0.00 |
| 4* | 96.51 | 3.06 | 0.10 | 0.05 | 0.23 | 0.03 | — | — | — | 0.02 | — | 0.00 |

TABLE 1-continued

| Sample No. | Al₂O₃ | SiO₂ | MgO | BaO | CaO | SrO | La₂O₃ | Nd₂O₃ | Pr₂O₃ | Y₂O₃ | Yb₂O₃ | Alkali metal (wt %) |
|---|---|---|---|---|---|---|---|---|---|---|---|---|
| 5* | 95.45 | 3.56 | 0.10 | 0.25 | 0.31 | 0.28 | — | — | — | — | 0.05 | 0.00 |
| 6* | 94.65 | 2.55 | 0.18 | 0.55 | 0.39 | 0.51 | — | — | — | — | 1.17 | 20.40 |

(Content Ratio of Each Component)

By using the content of each component shown in Table 1, (RE oxide/MgO), {RE oxide/(SiO₂+MgO+the group 2 element oxide)} and {BaO/(MgO+CaO+SrO+BaO)} were separately calculated. The calculated results are shown in Table 2. (RE oxide/MgO) is shown by "RE/MgO", {RE oxide/(SiO₂+MgO+the group 2 element oxide)} is shown by "RE/(SiO₂+the group 2)", and {BaO/(MgO+CaO+SrO+BaO)} is shown by "Ba/the group 2".

TABLE 2

| Sample No. | RE/MgO | RE/(SiO₂ + the group 2) | Ba/the group 2 |
|---|---|---|---|
| 1 | 17.50 | 0.23 | 0.00 |
| 2 | 17.38 | 0.23 | 0.97 |
| 3 | 17.38 | 0.23 | 0.00 |
| 4 | 17.50 | 0.24 | 0.21 |
| 5 | 5.59 | 0.85 | 0.27 |
| 6 | 5.40 | 0.91 | 0.25 |
| 7 | 6.50 | 0.24 | 0.29 |
| 8 | 16.00 | 0.84 | 0.28 |
| 9 | 8.40 | 0.24 | 0.29 |
| 10 | 6.88 | 0.21 | 0.81 |
| 11 | 6.53 | 0.23 | 0.21 |
| 12 | 15.55 | 0.84 | 0.26 |
| 13 | 17.20 | 0.25 | 0.21 |
| 14 | 12.16 | 0.82 | 0.27 |
| 15 | 7.95 | 0.30 | 0.27 |
| 16 | 13.90 | 0.75 | 0.28 |
| 17 | 10.10 | 0.38 | 0.30 |
| 18 | 6.64 | 0.21 | 0.80 |
| 19 | 8.60 | 0.36 | 0.40 |
| 20 | 10.44 | 0.40 | 0.65 |
| 21 | 6.50 | 0.32 | 0.56 |
| 22 | 6.14 | 0.37 | 0.54 |
| 23 | 7.21 | 0.37 | 0.55 |
| 24 | 9.21 | 0.38 | 0.58 |
| 25 | 10.95 | 0.56 | 0.56 |
| 26 | 12.64 | 0.38 | 0.60 |
| 27 | 13.86 | 0.72 | 0.56 |
| 1* | 0 | 0 | 0 |
| 2* | 0 | 0 | 0.22 |
| 3* | 0 | 0 | 0 |
| 4* | 0.007 | 0.000 | 0.12 |
| 5* | 0.014 | 0.001 | 0.27 |
| 6* | 6.50 | 0.28 | 0.34 |

In Table 2, the sample number with * refers to a comparative example.

(Withstand voltage evaluation)

Figure 2:
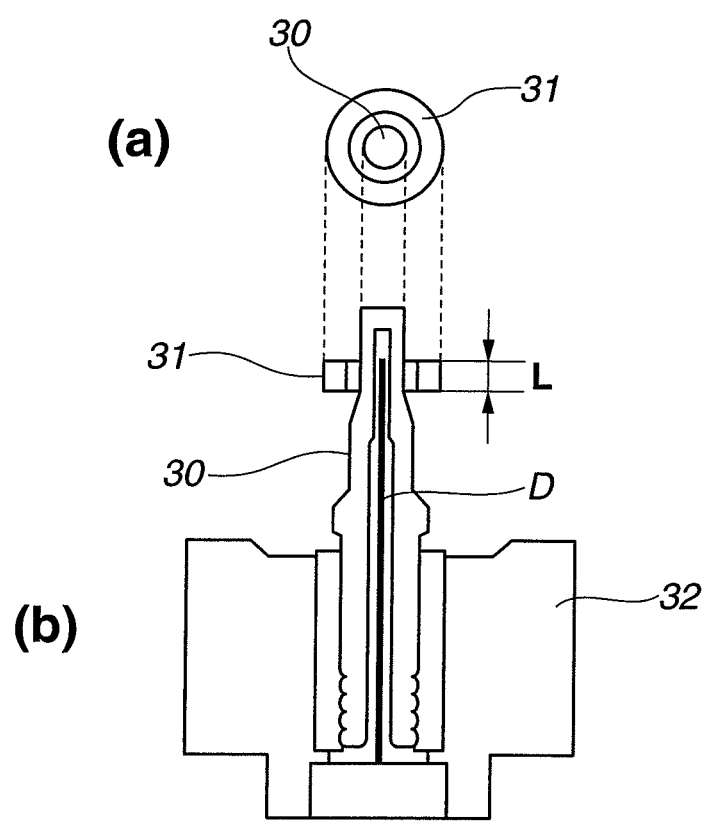

Withstand voltages at high temperatures of each sample were measured. The apparatus for measuring withstand voltage is shown in FIG. 2. FIG. 2(a) is an overhead view of an insulator 30 and a metal ring 31 surrounding the vicinity of a front end of the insulator 30. FIG. 2(b) is a sectional view of the insulator 30 and the ring 31. The insulator 30 used for measuring withstand voltage is equipped with an axial hole at a center portion of its axial direction, and a front end of the axial hole is in a closed condition. The ring 31, in which axis length L is 3-4 mm, is fixed in the vicinity of the front end of the insulator 30 by a fixing means not shown in the drawings. The insulator 30 has one end portion fixed by a base portion 32 and the other end portion projecting from the base portion 32. A center electrode D is disposed to be inserted into the axial hole. In this evaluation of withstand voltage at high temperatures, the measurement was made in a manner that a portion of the insulator 30 projecting from the base portion 32 was subjected to a high-frequency heating at 600-950° C., and, under conditions that a portion in the insulator 30, which was heated easily and positioned close to the metal ring 31, had reached predetermined temperatures of 800° C., 850° C. and 900° C., a voltage was applied between the center electrode D and the ring 31, and the voltage value when insulation breakdown had occurred to the insulator 30 was judged as being a withstand voltage value of the sample. The withstand voltage values measured are shown in Table 3.

(Relative Density)

The calculation was conducted to confirm that the insulator was densified. Firstly, apparent density was measured by a method in conformity with JIS R 1634, and relative density of each insulator was calculated by using theoretical density calculated from lattice constant and the measured apparent density. The calculated relative densities are shown in Table 3.

TABLE 3

| | Withstand voltage under heating (kV) | | | Relative |
|---|---|---|---|---|
| Sample No. | 800° C. | 850° C. | 900° C. | density (%) |
| 1 | 10.2 | 5.2 | 3.2 | 93.2 |
| 2 | 10.4 | 5.3 | 3.3 | 93.1 |
| 3 | 10.5 | 5.5 | 3.3 | 93.2 |
| 4 | 14.8 | 8.6 | 5.8 | 94 |
| 5 | 14.9 | 8.6 | 5.8 | 94 |
| 6 | 14.9 | 8.7 | 5.9 | 94 |
| 7 | 17.2 | 8.7 | 5.9 | 94.1 |
| 8 | 17.7 | 8.9 | 5.9 | 94.1 |
| 9 | 17.9 | 8.9 | 5.9 | 94.1 |
| 10 | 18.1 | 8.9 | 6 | 94.2 |
| 11 | 18.1 | 9 | 6 | 94.2 |
| 12 | 18.2 | 9.1 | 6.1 | 94.2 |
| 13 | 23.7 | 19.9 | 10.2 | 94.9 |
| 14 | 23.7 | 20.1 | 10.3 | 94.9 |
| 15 | 23.7 | 20.1 | 13.1 | 95 |
| 16 | 23.9 | 20.2 | 13.3 | 95 |
| 17 | 23.9 | 20.2 | 17.1 | 95.5 |
| 18 | 23.9 | 20.3 | 17.2 | 95.5 |
| 19 | 24 | 20.3 | 19.3 | 95.6 |
| 20 | 24.1 | 20.4 | 19.3 | 95.7 |
| 21 | 24.2 | 20.4 | 19.3 | 95.8 |
| 22 | 30.2 | 25.4 | 21.1 | 95.8 |
| 23 | 30.4 | 25.3 | 21.3 | 95.9 |
| 24 | 30.5 | 25.6 | 21.5 | 95.9 |
| 25 | 30.7 | 25.6 | 21.5 | 95.9 |
| 26 | 30.8 | 25.6 | 21.7 | 96 |
| 27 | 30.9 | 25.7 | 22 | 96 |
| 1* | 8.2 | 4.2 | — | 93.8 |
| 2* | 8.1 | 3.9 | — | 94.4 |
| 3* | 8.3 | 3.7 | — | 94.7 |
| 4* | 8.1 | 3.3 | — | 94.8 |
| 5* | 7.9 | 3.5 | — | 94.6 |
| 6* | 6.8 | 3 | — | 94.9 |

In the samples 1* to 6*, it was not possible to conduct the measurement at 900° C. due to the occurrence of insulation breakdown upon measuring withstand voltage characteristics. Therefore, in Table 3, the measurement results at 900° C. are shown by "—".

As understood from the results of Table 3, withstand voltage characteristics at high temperatures become low in the samples in which the content ratio of RE/MgO is outside of the range of 5.4-17.5 and in which the spots where hexaaluminate crystals are present do not contain the alkali metal component. Withstand voltage characteristics at high temperatures are superior in the samples in which the content ratio of RE/MgO is in the range of 5.4-17.5 and in which the spots where the existence of hexaaluminate crystals has been confirmed contain the alkali metal component. Therefore, insulation is maintained without the occurrence of insulation breakdown even at a high temperature of 900° C.

Furthermore, as understood from the results of Table 3, the samples 13-27, in which the content ratio of $RE/(SiO_2+MgO+\text{the group 2 element oxide})$ is in a range of 0.25-0.82, are improved in withstand voltage characteristics at high temperatures, and its withstand voltage characteristics are hard to become low even if the measurement temperature increases from 800° C. to 850° C. and 900° C., as compared with the samples 4-12 in which it is outside of the range of 0.25-0.82.

Furthermore, as understood from the results of Table 3, the samples 17-27, in which the content ratio of $BaO/(MgO+CaO+SrO+BaO)$ is in a range of 0.3-0.8, is improved in withstand voltage characteristics at high temperatures, and it was possible to secure high withstand voltage characteristics even at a high temperature of 900° C., as compared with the samples 4-16 in which it is outside of the range of 0.3-0.8.

(Measurement of Average Particle Size of Hexaaluminate Crystals)

The surface of each insulator was subjected to mirror polishing, and the polished surface was subjected to a thermal etching treatment for 10 minutes at a temperature that was lower than the burning temperature by 100° C. The surface subjected to this treatment was observed with a scanning electron microscope (SEM), and the average crystal particle size of the hexaaluminate crystals was measured by the intercept method. The results are shown in Table 4.

(Thermal Shock Properties)

In thermal shock properties evaluation of the insulators, the temperature difference between the heating temperature and the water temperature, when cracks occurred on an insulator by quenching the insulator heated at a predetermined temperature in water, was judged as thermal shock (ΔT). The measurement results of thermal shock properties are shown in Table 4.

TABLE 4

| Sample No. | Particle size (μm) | Thermal shock (ΔT) |
| --- | --- | --- |
| 1 | 6.4 | 177 |
| 2 | 6.4 | 178 |
| 3 | 6.5 | 177 |
| 4 | 6.4 | 178 |
| 5 | 6.3 | 178 |
| 6 | 6.2 | 178 |
| 7 | 6.1 | 179 |
| 8 | 6.1 | 179 |
| 9 | 6.1 | 180 |
| 10 | 6 | 180 |
| 11 | 5.9 | 180 |
| 12 | 5.7 | 181 |
| 13 | 5.6 | 181 |
| 14 | 5.6 | 182 |
| 15 | 5.4 | 182 |
| 16 | 5.4 | 183 |
| 17 | 5.3 | 183 |
| 18 | 5.3 | 183 |
| 19 | 5.3 | 183 |
| 20 | 5.3 | 184 |
| 21 | 5 | 197 |
| 22 | 4.6 | 199 |
| 23 | 4.5 | 200 |
| 24 | 4.5 | 200 |
| 25 | 4.4 | 201 |
| 26 | 4.3 | 201 |
| 27 | 4.2 | 201 |
| 1* | — | 150 |
| 2* | — | 151 |
| 3* | — | 153 |
| 4* | — | 153 |
| 5* | — | 154 |
| 6* | — | 150 |

It is understood that the samples 21-27, in which the average particle size of the hexaaluminate crystals was not greater than 5 μm, were high in thermal shock properties, and it was possible to obtain not only high withstand voltage characteristics at high temperatures, but also strength, as compared with the samples 4-20, in which the average particle size of the hexaaluminate crystals was greater than 5 μm.

(Particle Size of Raw Material)

As particle size of the raw material, there was used the average particle size measured by laser diffractometry by Microtrac particle size distribution measurement device (MT-3000) made by NIKKISO CO., LTD. The ratio of the average particle size of alumina powder to the average particle size of the secondary raw material in each sample was calculated and is shown in Table 5.

TABLE 5

| Sample No. | Average particle size ratio alumina/secondary raw material | Burning temperature (° C.) | Pulverization time (hour) | Contraction per 1° C. (mm/° C. × 10$^{-4}$) |
| --- | --- | --- | --- | --- |
| 1 | 0.7 | 1600 | 21 | 3.9 |
| 2 | 0.9 | 1590 | 22 | 3.9 |
| 3 | 0.8 | 1590 | 24 | 4.1 |
| 4 | 0.7 | 1580 | 20 | 4.0 |
| 5 | 0.7 | 1570 | 21 | 3.9 |
| 6 | 0.8 | 1450 | 21 | 3.8 |
| 7 | 0.9 | 1600 | 24 | 3.7 |
| 8 | 1 | 1620 | 24 | 3.5 |
| 9 | 1.1 | 1590 | 26 | 3.3 |
| 10 | 4.5 | 1550 | 52 | 1.0 |
| 11 | 5 | 1570 | 54 | 0.9 |
| 12 | 5.1 | 1590 | 55 | 1.1 |
| 13 | 1.2 | 1620 | 32 | 1.9 |
| 14 | 4.4 | 1650 | 35 | 1.8 |
| 15 | 1.6 | 1600 | 29 | 1.1 |
| 16 | 2.2 | 1610 | 30 | 1.1 |
| 17 | 2.5 | 1600 | 30 | 1.1 |
| 18 | 2.9 | 1590 | 31 | 1.2 |
| 19 | 2.3 | 1600 | 31 | 1.2 |
| 20 | 2.2 | 1580 | 30 | 1.2 |
| 21 | 2.7 | 1620 | 32 | 1.2 |
| 22 | 3.6 | 1640 | 33 | 1.3 |
| 23 | 3.4 | 1645 | 30 | 1.0 |
| 24 | 2.6 | 1600 | 32 | 1.1 |
| 25 | 2.9 | 1550 | 31 | 1.1 |
| 26 | 3.1 | 1530 | 32 | 1.2 |
| 27 | 2.5 | 1575 | 30 | 1.1 |
| 1* | 1.7 | 1620 | 28 | 4.0 |
| 2* | 2.1 | 1590 | 32 | 5.0 |
| 3* | 0.7 | 1630 | 33 | 4.4 |
| 4* | 4.8 | 1590 | 47 | 6.6 |
| 5* | 4.7 | 1640 | 51 | 3.4 |
| 6* | 4.7 | 1620 | 50 | 3.3 |

The samples 13-27, in which the particle size ratio of the alumina to the secondary raw material satisfies 1.2-4.4, as compared with the samples 1-12, in which this numerical range is not satisfied, have greater relative densities and show higher withstand voltages even at a high temperature of 900° C. That is, it is possible to have both of a sufficient densification and the improvement of withstand voltage characteristics at high temperatures by having the particle size ratio of the raw material within a specified range.

Furthermore, the samples 13-27 are also smaller in contraction per 1° C., as compared with the samples 1-9, which are lower than the numerical range of the particle size ratio of the alumina to the secondary raw material. That is, being small in contraction per 1° C. means that, when the burning temperature has deviated by 1° C., the deviation of the actual contraction from the target contraction is small. An insulator to be used for spark plugs is produced in the order of the adjustment of external configuration at the stage of a compact prior to the burning and then conducting the burning. Therefore, even if the burning temperature deviates somewhat during the burning, it is requested that the insulator size after the burning is within a predetermined tolerance range, and it is preferable that contraction per 1° C. is small. Furthermore, the samples 13-27 are shorter in pulverization time of the raw material, as compared with the samples 10-12, which are higher than the numerical range of the particle size ratio of the alumina to the secondary raw material. If pulverization time of the raw material is short, it is possible to secure a high productivity of the spark plug of this invention.

Therefore, it is possible to make contraction per 1° C. small and to shorten pulverization time of the raw material, by making the particle size ratio of the alumina to the secondary raw material satisfy 1.2-4.4.

Industrial Applicability

The spark plug of this invention can be applied to spark plugs that can have high temperatures during use, for example, spark plugs used for high-powered combustion engines.

| EXPLANATION OF SYMBOLS | |
| --- | --- |
| 1 | spark plug |
| 2, D | center electrode |
| 3 | insulator |
| 4 | metal shell |
| 6 | grounding electrode |
| 7 | outer member |
| 8 | inner member |
| 9 | threaded portion |
| G | spark discharge gap |
| 30 | insulator |
| 31 | ring |
| 32 | base portion |
| L | axis length |

The invention claimed is:

1. A spark plug equipped with a center electrode, a substantially cylindrical insulator provided on a periphery of the center electrode, and a substantially cylindrical metal shell provided on a periphery of the insulator, the spark plug being characterized by that the insulator is equipped with an alumina-based sintered body containing silicon component (hereinafter referred to as Si component), magnesium component (hereinafter referred to as Mg component), at least one component (hereinafter referred to as group 2 element component) selected from calcium component, strontium component, and barium component, and a rare earth element component (hereinafter referred to as RE component), that a grain boundary phase of the alumina-based sintered body has a hexaaluminate crystal containing the RE component, that, in the alumina-based sintered body, ratio of the RE component to the Mg component by mass ratio in terms of oxide (RE oxide/MgO) satisfies $5.4 \leq$ RE oxide/MgO $\leq 17.5$, and that content of an alkali metal component in terms of oxide in a spot, where the hexaaluminate crystal is present, of circular spots having a diameter of 0.3 nm ranges from 0.01 mass % to 20 mass % when the grain boundary phase of the alumina-based sintered body is observed with a transmission electron microscope, wherein the spot where the alkali metal component content is in the range contains the hexaaluminate crystal and the Si component.

2. A spark plug according to claim 1, wherein, in the alumina-based sintered body, ratio of the RE component to the Si component, the Mg component and the group 2 element component by mass ratio in terms of oxide {RE oxide/(SiO$_2$+MgO+the group 2 element oxide)} satisfies $0.25 \leq$ RE oxide/(SiO$_2$+MgO+the group 2 element oxide) $\leq 0.82$.

3. A spark plug according to claim 1, wherein the barium component (hereinafter referred to as Ba component) is contained in the alumina-based sintered body, wherein the group 2 element component contained in the alumina-based sintered body is the calcium component (hereinafter referred to as Ca component) and/or the strontium component (hereinafter referred to as Sr component), and wherein in the alumina-based sintered body the ratio of the Ba component to the Ba component, the Mg component and the Ca component and/or the Sr component by mass ratio in terms of oxide {BaO/(MgO+CaO+SrO+BaO)} satisfies $0.3 \leq$ BaO/(MgO+CaO+SrO+BaO) $\leq 0.8$.

4. A spark plug according to claim 1, wherein the hexaaluminate crystal has an average particle size of 5 μm or less.

5. A spark plug according to claim 1, wherein a layered structure or a solid solution is formed by the hexaaluminate crystal and the Mg component and the group 2 element component.

6. A spark plug according to claim 1, wherein the alumina-based sintered body is produced by mixing an alumina raw material with a secondary raw material comprising the Si component, the Mg component and the group 2 element component, and the RE component in a slurry, followed by granulation, shaping and burning, and wherein the particle size ratio ($D_{alumina\ raw\ material}/D_{secondary\ raw\ material}$) of the average particle size of the alumina raw material to the average particle size of the secondary raw material in the slurry is $1.2 \leq D_{alumina\ raw\ material}/D_{secondary\ raw\ material} \leq 4.4$.

* * * * *